June 30, 1942.    M. KALISCHER    2,288,587
REFRIGERATION
Filed Dec. 24, 1940    2 Sheets—Sheet 1

WITNESSES:

INVENTOR
MILTON KALISCHER
BY
ATTORNEY

June 30, 1942. M. KALISCHER 2,288,587
REFRIGERATION
Filed Dec. 24, 1940 2 Sheets-Sheet 2

WITNESSES:
H. R. Heintzen
E. H. Lutz

INVENTOR
MILTON KALISCHER
BY
ATTORNEY

Patented June 30, 1942

2,288,587

UNITED STATES PATENT OFFICE 2,288,587

REFRIGERATION

Milton Kalischer, Longmeadow, Mass., assignor to Westinghouse Electric & Manufacturing Company, East Pittsburgh, Pa., a corporation of Pennsylvania Application December 24, 1940, Serial No. 371,601

6 Claims. (Cl. 62—89)

This application relates to refrigerators equipped with sterilizing lamps and more particularly to a means for starting sterilizing lamps in mechanical refrigerators.

Sterilizing lamps of the vapor type ordinarily require a high starting voltage, which voltage, however, may be reduced by heating the electrodes of the lamp. A lamp of this type, if extinguished by a failure of the electric current, requires a repetition of the heating of the electrodes before it will start.

It is an object of this invention to provide for periodically heating the electrode of a vapor type sterilizing lamp housed in a refrigerator to start the lamp if it should have become extinguished.

Another object is to provide means for periodically actuating the starting mechanism of a vapor sterilizing lamp in a mechanical refrigerator in response to the movement of some portion of the refrigerator.

These and other objects are effected by my invention as will be apparent from the following description and claims taken in connection with the accompanying drawings, forming a part of this application, in which:

Figure 1:
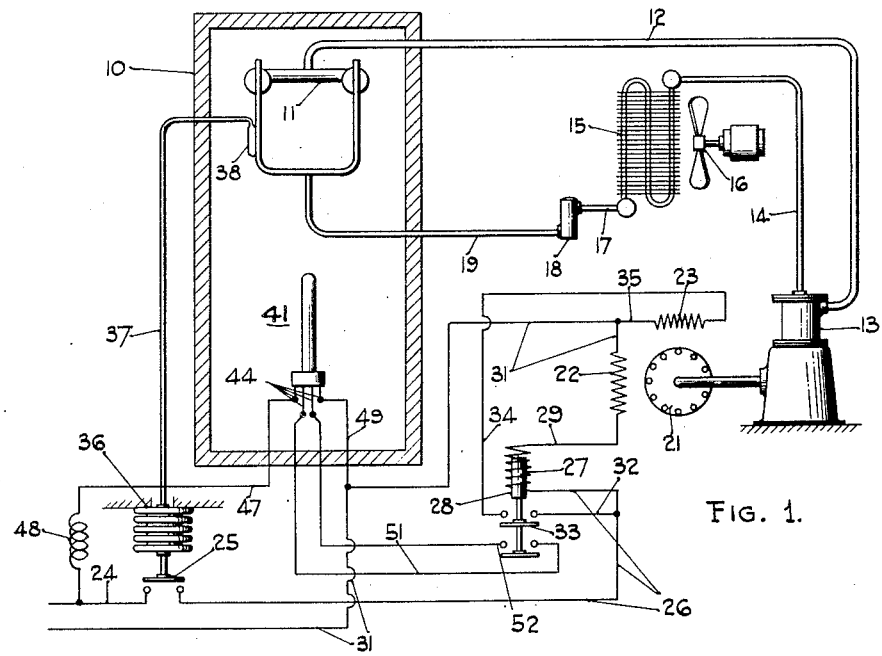
Fig. 1 is a diagrammatic representation of a sterilizing lamp in a mechanical refrigerator and a means embodying the invention for closing the starting circuit of the sterilizing lamp through auxiliary contacts in the starting relay of the motor.

Referring now to Fig. 1 the reference numeral 10 represents an insulated cabinet having an evaporative cooling unit 11 therein, which is connected through a suction tube 12 with a compressor 13. The compressed refrigerant is conducted through the tube 14 to the condenser 15 wherein it is liquefied. The condenser 15 is cooled by a blast of air from a motor-driven fan 16. From the condenser 15, the refrigerant liquid passes through a tube 17 to a casing 18 containing a float controlled expansion valve, not shown in the drawings, and from this casing 18 the refrigerant passes through the tube 19 to the evaporator.

The compressor 13 is driven by a motor comprising a rotor 21, running winding 22, and starting winding 23. The running winding 22 secures power from a source (not shown), through a circuit comprising a conductor 24, a switch 25, conductor 26, winding 27 of a double contact relay 28 and conductors 29 and 31. The relay 28 is biased by gravity or other means to be in the open position when the normal running current flows through the winding 27 of the relay 28 and to close when an abnormally high current, such as the starting current of the motor flows through its winding 27. When in the closed position, the relay 28 completes the circuit of the starter winding through lead 32, connected to the conductor 26, blade 33 of the switch of the relay 28, lead 34 and lead 35 connected to the conductor 31. The starting of the motor 21 is controlled by the switch 25 which is actuated by the thermosensitive element comprising a Sylphon bellows 36, tube 37, and bulb 38 in contact with the evaporator 11. As thus far described, the apparatus is well-known in the refrigeration art.

Figure 6:
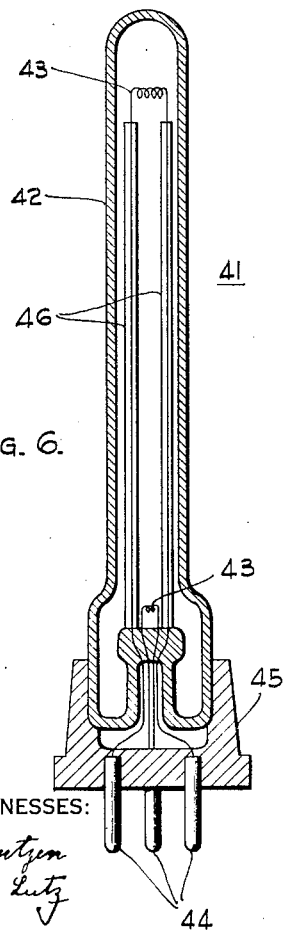
Fig. 6 is a sectional view of the sterilizing lamp.
Figure 7:
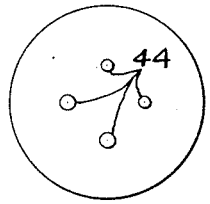
Fig. 7 is a view of the bottom of the base of the sterilizing lamp.

A sterilizing lamp 41 such as shown in Figs. 6 and 7 and operating according to the principles described in greater detail in the application for Letters Patent of R. F. James, Serial No. 734,620, filed July 11, 1934, and assigned to the assignee of the present application, is housed in the insulated cabinet 10. The sterilizing lamp 41 comprises a tube 42 of special glass enclosing vapors which are rendered radiating by the passage of an electric current therethrough. Electrodes 43 of the sterilizing lamp 41 are formed of coiled heating elements similar to the filaments of electric light bulbs. Each of the electrodes 43 has two terminals 44 brought out to a base 45 of the lamp so that a heating current may be conducted through each of the electrodes 43. The base 45 of the lamp 41 is of the type used in radio tubes and comprises four prongs, each of which connects to one of the terminals of the electrodes.

One electrode 43 is placed near the base of the tube 42 and the other at the opposite end of the tube 42 and its leads are enclosed in insulating glass tubes 46.

The lamp 41 may be started by connecting a terminal 44 of one electrode 43 of the lamp 41 to a conductor of a 110 volt circuit and a terminal 44 of the other electrode 43, through a ballast reactance, to the other conductor of a 110 volt circuit. If the remaining two terminals 44 of the lamp are now bridged by a conductor, a heating current will flow through each of the electrodes 43 in series and the lamp will light on breaking the bridging connection. The current will then flow from one terminal 44 to the other through the vapor of the lamp and will continue to flow until an interruption of the supply voltage occurs. When this occurs the heating of the electrodes must be repeated.

To insure the substantially continuous burning of the sterilizing lamp, provision is made for periodically bridging the starting contacts in response to some movement of the refrigerant mechanism. This may be accomplished in numerous ways and only five are shown in this application.

Referring again to Fig. 1, one terminal 44 of one of the electrodes 43 of the sterilizing lamp 41 is connected by lead 47 and the ballast reactance 48 to the power lead 24. One terminal 44 of the other electrode 43 is connected by lead 49 to the conductor 31. The remaining two terminals 44 of the sterilizing lamp 41 are each connected by a lead 51 to one of two auxiliary contacts 52 of the relay 28, which contacts are bridged whenever the relay 28 closes. Whenever, therefore, the motor of the refrigerating apparatus is started by the thermo-sensitive element, the starting terminals of the sterilizing lamp will be bridged and the lamp will relight if it has become extinguished.

Figure 2:
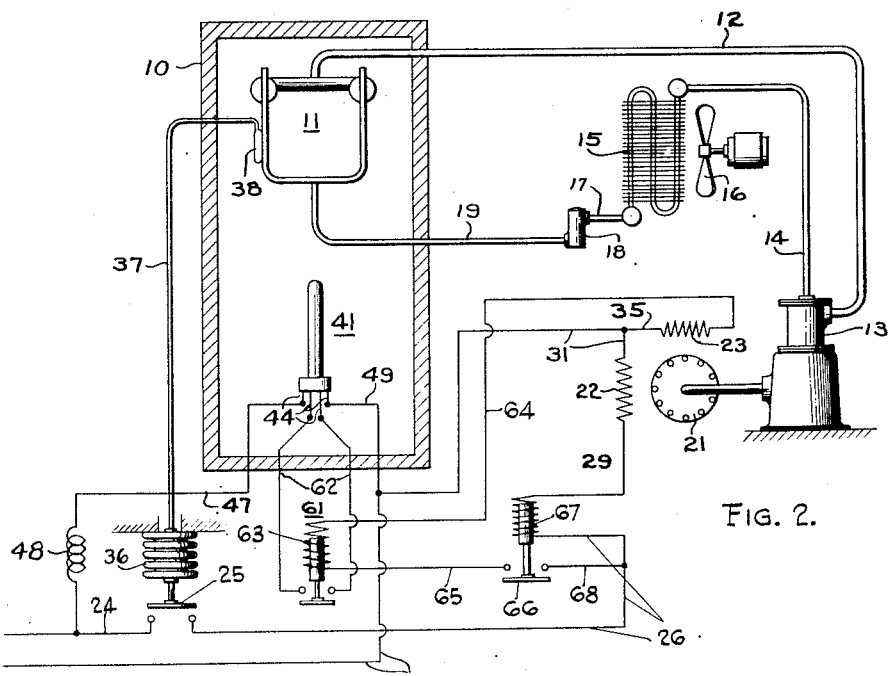
Fig. 2 is a diagrammatic representation of a modification of the invention similar to the modification shown in Fig. 1 but showing the starting circuit of the sterilizing lamp being closed by a relay in the starting circuit of the motor.

The same result is accomplished in the modification shown in Fig. 2 by placing a relay in the circuit of the starting winding of the motor. The apparatus of the circuit insofar as it is identical with Fig. 1, is provided with the same reference numerals. The auxiliary contacts on the armature of the relay are eliminated and a separate relay 61 is provided for the sterilizing lamp 41 and the starting terminals 44 of the sterilizing lamp 41 are connected to the contacts of the relay 61 by leads 62. Winding 63 of the relay 61 is in the starting circuit of the motor 21, which circuit comprises leads 64 and 65, switch blade 66 of relay 67, and lead 68.

Figure 3:
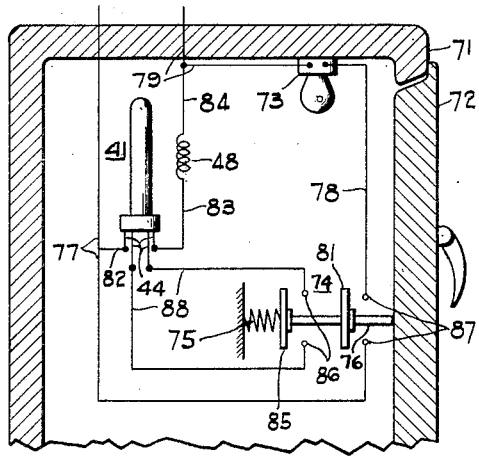
Fig. 3 is a diagrammatic representation of another modification of the invention wherein the starting circuit is closed by auxiliary contacts on the switch for the illuminating lamp when the door is in the closed position.
Figure 4:
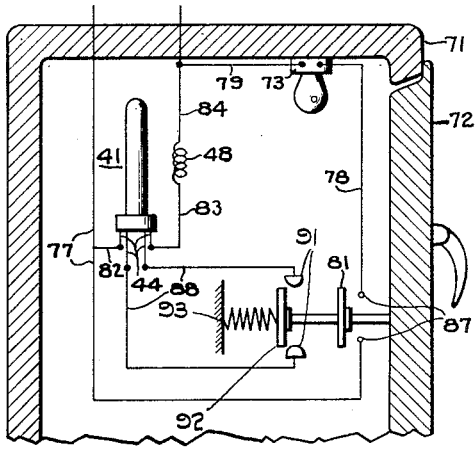
Fig. 4 is another modification in which the starting circuit of the lamp is closed by a relay in the lighting circuit of the illuminating lamp of the refrigerator.
Figure 5:
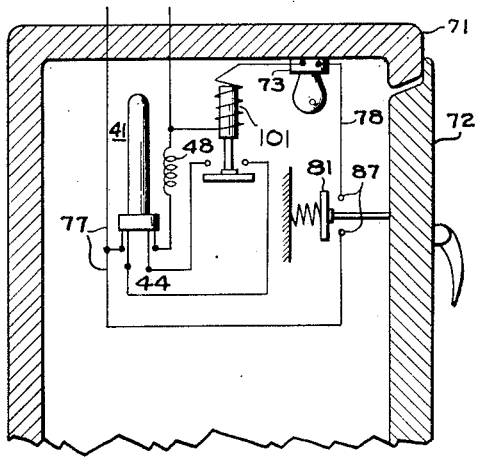
Fig. 5 is a further modification similar to the one shown in Fig. 3 but showing the starting circuit of the lamp being established by auxiliary contacts on the door control switch which are closed when the door is near the closed position.

Further modifications embodying the invention are shown in Figs. 3, 4, and 5 wherein the starting terminals of the sterilizing lamp are bridged whenever the door of the refrigerator is opened. Referring now to Fig. 3, the reference numeral 71 designates an insulated cabinet, having a door 72 and an illuminating lamp 73 therein controlled by a door operated switch 74. The switch 74 is biased in the closed position of the spring 75. An actuating rod 76 opposes the spring 75 and is contacted by the door 72 as it closes so that the switch 74 is opened. The lamp 73 is supplied with electric current from a source (not shown) through conductors 77, 78, and 79 and blade 81 of the switch. As thus far described, the apparatus is well known in the art.

The sterilizing lamp 41 is secured in the insulated cabinet 71 and is connected to the power supply, through leads 82, 83, and 84 and the ballast reactance 48. The switch 74 is provided with an auxiliary blade 85 and two auxiliary contacts 86 which are closed in unison with the contacts 87 for the illuminating circuit. The two starting terminals 44 of the sterilizing lamp are connected by leads 88 to the two auxiliary contacts 86 of the switch 74 so that the starting circuit is established whenever the door 72 of the refrigerator 71 is opened.

Fig. 4 shows another embodiment of the invention similar to the embodiment of Fig. 3 in which the auxiliary contacts 91 are arranged for sliding engagement with the blade 92 of the switch 93 and are positioned so that the engagement is established only when the door 72 is near its closed position. The sterilizing lamp 41 will then be in operation when the door 72 is fully opened and also when fully closed. In all other essentials the modification shown in Fig. 4 is similar to that of Fig. 3 and like parts have been provided with the same reference numerals.

Fig. 5 shows a further modification of the invention which is similar to the modification shown in Fig. 3 but in which the auxiliary contacts are eliminated and a separate relay 101 substituted for them. This relay 101 is energized by the lighting circuit and closes the starting circuit of the sterilizing lamp 41 whenever the lighting circuit is closed. The action of this relay 101 is similar to the relay 61 described in the modification shown in Fig. 2 and its action and connection is believed to be apparent without further explanation.

It will be apparent from the above description that this invention provides a means for actuating the starting circuit of a sterilizing lamp in response to some movement in the normal operation of a refrigerator.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a mechanical refrigerator, the combination of an insulated chamber, a cooling unit therefor, a mechanism for supplying refrigerant to said cooling unit, said mechanism including a motor requiring a high starting current, a control device for starting and stopping said motor, a sterilizing lamp in said chamber, said sterilizing lamp having a starting device, and means responsive to the high starting current of the motor for actuating the starting device.

2. In a mechanical refrigerator, the combination of an insulated cabinet, a cooling unit therefor, a mechanism for supplying refrigerant to said cooling unit, said mechanism including a motor having a starting winding, a control device for starting and stopping the motor, a sterilizing lamp in said cabinet, said sterilizing lamp having a starting device, and means responsive to an electric current flowing through said starting winding of the motor for actuating the starting device of the sterilizing lamp.

3. In a mechanical refrigerator, the combination of an insulated cabinet, a cooling unit therefor, a mechanism for supplying refrigerant to said cooling unit, said mechanism including a motor having a starting relay, auxiliary contacts in said relay, a control device for starting and stopping the motor, a sterilizing lamp having a starting device, and means responsive to the closing of said auxiliary contacts for actuating said starting device.

4. In a mechanical refrigerator, the combination of an insulated cabinet, a cooling unit therefor, an intermittently operated mechanism for supplying said cooling unit with refrigerant, a sterilizing lamp in said cabinet, said lamp comprising electrodes, means for heating said electrodes to start said lamp, a switch controlling said heating means, and means responsive to a phase of the intermittent operation of said mechanism for closing and thereafter opening said switch to start said sterilizing lamp.

5. In a mechanical refrigerator, the combination of an insulated cabinet, apparatus for abstracting heat therefrom, a sterilizing device for said cabinet, said sterilizing device requiring a starting mechanism differing from the mechanism for normally maintaining the device in operation, a starting mechanism for said device, and means responsive to the temperature of said cabinet for starting and stopping said apparatus and for actuating said starting mechanism.

6. In a mechanical refrigerator, the combination of an insulated cabinet, a cooling unit therefor, a mechanism for supplying refrigerant to said unit, said mechanism including a motor having a running winding and a starting winding, a starting relay responsive to the current in the running winding for energizing said starting winding, auxiliary contacts on said relay, a control device for starting and stopping the motor to maintain the temperature of said cabinet between predetermined limits, a sterilizing lamp, and means responsive to the closing of said auxiliary contacts for actuating said lamp.

MILTON KALISCHER.